US006705794B2

United States Patent
Varner et al.

(10) Patent No.: US 6,705,794 B2
(45) Date of Patent: Mar. 16, 2004

(54) DISPLAY FORM HAVING MAGNETICALLY ATTACHABLE PARTS

(75) Inventors: Richard Varner, Longmont, CO (US); James D. Barber, Longmont, CO (US); James Talaric, Louisville, CO (US)

(73) Assignee: Fusion Specialties, Inc., Broomfield, CO (US)

( * ) Notice: Subject to any disclaimer, the term of this patent is extended or adjusted under 35 U.S.C. 154(b) by 0 days.

(21) Appl. No.: 09/771,431

(22) Filed: Jan. 26, 2001

(65) Prior Publication Data

US 2002/0064416 A1 May 30, 2002

Related U.S. Application Data (60) Provisional application No. 60/178,187, filed on Jan. 26, 2000.

(51) Int. Cl.[7] ............... A63H 3/14; D06C 15/00; F16C 11/00; F16D 1/12; F16G 11/00
(52) U.S. Cl. ............... 403/24; 403/84; 403/104; 403/404; 403/DIG. 1; 223/66; 446/328; 446/378; 446/384; 446/390; 446/391
(58) Field of Search ............... 403/84, 83, 104, 403/119, 179, 404, 410, DIG. 1, 24; 223/66, 68, 1, DIG. 2; 446/268, 327, 328, 330, 376, 377, 378, 381, 382, 383, 384, 391, 390, 401; 434/267, 270, 274, 296

(56) References Cited

U.S. PATENT DOCUMENTS

| | | | |
|---|---|---|---|
| 2,081,071 A | 5/1937 | Scovil et al. ............... 18/59 |
| 2,465,971 A | 3/1949 | Leblang ............... 46/45 |
| 2,595,485 A | 5/1952 | Roman ............... 24/221 |
| 2,661,480 A | 12/1953 | Rosen et al. ............... 3/13 |
| 2,695,950 A | 11/1954 | Zingone ............... 240/52.15 |
| 2,963,167 A | 12/1960 | Norman ............... 211/74 |
| 2,970,388 A | 2/1961 | Yonkers ............... 35/18 |
| 2,975,497 A | 3/1961 | Budreck ............... 24/201 |
| 3,028,058 A | 4/1962 | Wolf ............... 223/68 |
| 3,041,697 A | 7/1962 | Budreck ............... 24/201 |
| 3,068,615 A | 12/1962 | Nassour ............... 46/241 |
| 3,090,155 A | 5/1963 | Gordon ............... 46/22 |
| 3,140,712 A | 7/1964 | Hunter ............... 128/92 |
| 3,168,227 A | 2/1965 | Osmond ............... 223/66 |
| 3,246,422 A | 4/1966 | Teagarden ............... 46/22 |
| 3,375,604 A | 4/1968 | Alonso ............... 46/22 |

(List continued on next page.)

FOREIGN PATENT DOCUMENTS

| | | |
|---|---|---|
| DE | 1 027 473 | 4/1958 |
| DE | 1 032 613 | 6/1958 |
| FR | 1101502 | 7/1955 |
| FR | 1 172 805 | 2/1959 |
| FR | 1 266 884 | 7/1961 |
| GB | 196 865 | 5/1923 |

*Primary Examiner*—Christopher J. Novosad
(74) *Attorney, Agent, or Firm*—Greenlee, Winner and Sullivan P.C.

(57) ABSTRACT

Forms for display of clothing and the like with magnetically attachable parts are provided. The magnetic joints comprise a magnetic assembly with a depth-of-pull sufficient to cause the attachable part to begin to pull toward the form at a distance preferably greater than one-half inch, preferably about one inch. Preferably the magnetic assembly has a depth-of-pull of at least about 120 gauss at a distance of one inch. A metallic plate is arranged in mating configuration with the magnetic assembly. Mating pins may be provided, as well as indexing pins. If the manikin is knocked over, or if the attached part is pulled or bumped, it will come loose rather than breaking off; and the mating parts are self-seeking in use, so that they will come together in proper orientation even when being mated beneath clothes. A bump to the manikin sufficient to overcome the on-contact strength of the magnetic attachment may not result in detachment of the limb because of the depth-of-pull strength of the magnetic assembly. The indexing pins allow the limbs to be placed in a variety of positions.

37 Claims, 7 Drawing Sheets

U.S. PATENT DOCUMENTS

| | | | |
|---|---|---|---|
| 3,464,146 A | 9/1969 | McCurdy | 46/22 |
| 4,038,775 A | 8/1977 | Sato | 46/22 |
| 4,118,888 A | 10/1978 | Ogawa | 46/22 |
| 4,176,492 A | 12/1979 | Sims et al. | 46/22 |
| 4,609,325 A | 9/1986 | Gabrielli | 414/755 |
| 5,112,265 A | 5/1992 | Naum | 446/384 |
| 5,277,643 A | 1/1994 | Ejima | 446/93 |
| 5,295,889 A | 3/1994 | Ejima | 446/91 |
| 5,727,717 A | 3/1998 | Vigne | 223/66 |
| 6,203,396 B1 | 3/2001 | Asmussen et al. | 446/376 |

PRIOR ART

PRIOR ART

FIG. 7B

DISPLAY FORM HAVING MAGNETICALLY ATTACHABLE PARTS

CROSS-REFERENCE TO RELATED APPLICATIONS

This application claims priority from U.S. application Ser. No. 60/178/187 filed Jan. 26, 2000, which is incorporated herein by reference to the extent not inconsistent herewith.

BACKGROUND

Forms or manikins to display clothing or other merchandise are models of complete human bodies or parts thereof, often of life-size proportions. It is difficult to dress such forms unless the limbs are detachable.

U.S. Pat. No. 3,028,058 discloses a manikin with truncated legs, swiveling arms, and a detachable head. In manikins with removable parts, at least one leg is often made to be removable, arms are removable, and the torso may be made in two parts. Hands may also be detachable. Bayonet attachments are common means for attaching detachable limbs to forms, wherein a projection on the limb must be inserted into an appropriately shaped hole in the form, and turned for locking into place. U.S. Pat. No. 2,595,485 describes a fastener of this type, as does U.S. Pat. No. 2,081,071. There are numerous drawbacks to this method. The operation of attaching the removable piece must usually be performed blind, i.e. under the clothing. Often, once the removable piece is locked into position, it cannot be changed so as to place the limbs in various expressive attitudes. Further, if the limb is bumped, it may be easily broken, or the entire form knocked over and damaged.

One attempt to solve these problems is described in U.S. Pat. No. 5,727,717, which provides joints for manikins which use sandwich magnets to keep the limbs in place. Male and female contours are used to provide mating surfaces, and once the joint is in place, it does not rotate. A drawback of this device is that the sandwich magnets do not provide sufficient depth-of-pull to keep the limb from being easily knocked off by customers and store personnel by bumping when the form is in use. If the limb is bumped with sufficient force to overcome the on-contact strength of the magnet, the limb will simply fall off. Further, the limb must be positioned with greater accuracy for attachment, since the sandwich magnet does not exert much force at a distance therefrom to pull the limb into place when it has been placed approximately in the correct position. This device may allow limbs to be positioned in two positions 180 degrees apart, but does not allow for positioning in attitudes between these extremes. Moreover, it is difficult to provide sufficient strength with the sandwich magnets described in that patent for secure attachment at small joints such as wrists and ankles, and the weight to strength ratio of such sandwich magnets is not good.

A lightweight means for attaching removable limbs to a form is needed which allows the limbs to be easily seated into place when the operator moves them into approximate alignment, which holds with sufficient force that the limbs are not easily knocked off by being bumped, but which does allow for detachment of the limbs when sufficient force is applied which would otherwise knock over and damage the entire form.

All publications referred to herein are incorporated by reference to the extent not inconsistent herewith.

SUMMARY OF THE INVENTION

A form is provided which has a removable piece attached thereto by a magnetic system comprising a magnetic assembly having a depth-of-pull sufficient to cause the removable piece to seek home, i.e., begin to move toward the attracted material, at a distance of at least one inch or, in other embodiments, a distance greater than one-half inch, e.g., a distance of about three-fourths inches. In one embodiment, this depth of pull is about 120 gauss at one inch, more preferably it is greater than about 200 gauss at one inch and, most preferably, is about 240 gauss at one inch. Said magnetic assembly is positioned on said form or said removable piece. Said magnetic system also comprises an attracted material on the other of said form or said removable piece so as to mate with said magnetic assembly.

A "form" is a manikin which may be in the shape of a human or animal, or a stylized human or animal. The removable piece may be any portion of the form, and is preferably selected from the group consisting of an arm, an upper arm, a lower arm, a hand, a leg, an upper leg, a lower leg, a foot, a head, a torso, and a pelvis.

The attracted material may be steel, iron, or other magnetically-adherent material known to the art, and is positioned on the other of the removable piece or the main body of the form and designed to mate with a corresponding magnetic assembly. Magnetic assemblies and attracted materials may also be placed on either or both ends of magnetic limbs, so that portions of limbs may be attached to each other, e.g. hands to lower arms to upper arms. A given detachable piece may comprise one or more structures made of attracted material, one or more magnetic assemblies, one of each, or any combination thereof as required to assemble the complete form.

The attracted material is preferably a piece of metal, preferably a steel disc having a thickness of at least about one-eighth inch. A thinner material will result in a less strong magnetic bond. Thicker pieces may be used, but will result in a heavier and more costly joint.

The depth-of-pull of the magnetic assembly is the amount of force exerted by the magnetic material at a point a given distance from the magnetic assembly. Preferably, the magnetic assembly has a depth-of-pull of at least about 200 gauss at one inch, and more preferably a depth-of-pull of about 240 gauss at one inch. The depth-of-pull is preferably no greater than about 250 gauss at one inch to avoid pinching the operator's fingers by having the magnetic assembly engage with the attached material too quickly and strongly.

In addition to its depth-of-pull, the magnetic assembly will also have an on-contact strength, which is the amount of force required to separate the magnetic assembly from direct contact with the attracted material. Preferably, for joining an adult-size arm to a form, the magnetic assembly has an on-contact strength of at least about 60–120 pounds, more preferably at least about 85 pounds, and most preferably, at least about 100 pounds. The on-contact strength is preferably no greater than about 120 pounds. For a shoulder cap, used to cover the shoulder joint when no arm is required for the form, the on-contact strength is preferably no more than about 20 pounds. The amount of on-contact strength required should be sufficient to hold the limb in place and prevent it from easily being knocked off during normal use and not so great as to prevent manual disengagement of the limb by the operator.

Appropriate on-contact strengths will be readily ascertainable by those of skill in the art, depending on the application. A discussion of magnetic properties and design is found at www.magnetsales.com.

While prior art magnetic limb attachments utilize magnets having good on-contact strength, the need for good depthof-pull has not previously been recognized, and devices which provide good depth-of-pull have not been provided.

As used herein, depth-of-pull is defined in terms of gauss readings at various distances from the magnetic material measured in air, in the absence of an attracted material.

A greater or lesser amount of magnetic material may be used in a larger or smaller magnetic assembly designed to fit infant wrist joints, adult arms, legs, heads, or other parts with differently-sized cross-sections to provide the required depth-of-pull. Preferably, the magnetic assembly is arranged as described herein for the preferred embodiment, scaled up or down as appropriate. However, other materials and configurations may be used, as will be appreciated by those skilled in the art.

The cup design is especially useful for adapting to various joint sizes since its on-contact strength can be varied, e.g., from around 0.5 pounds up to 180 pounds with selection of appropriate magnetic materials.

The magnetic material and configuration of the magnetic assembly to provide appropriate on-contact strengths will be readily ascertainable by those skilled in the art without undue experimentation in accordance with principles discussed herein and known to the art.

The manikins of this invention having magnetically attachable parts have the following advantages: If the manikin is knocked over, or if someone pulls on the attached part, it will come loose rather than breaking off; and the mating parts are self-seeking in use, so that they will come together in proper orientation even when being mated beneath clothes. Generally, manikins are dressed with arms removed, and the arms then have to be inserted and positioned inside the sleeves "blind," without the dresser being able to see to align them properly. The self-seeking feature of the magnetic mating parts of this invention substantially aids in ease of dressing and provides a significant time savings for manikin dressers.

In a preferred embodiment hereof, a cup magnetic assembly comprising a circular cup which serves as a pole piece is provided. It is believed that the cup shape focuses the magnetic energy toward the front (top edge of the cup), minimizing leakage of magnetic force. The cup need not be circular; it can also be square, rectangular, oval, polygonal, or other shapes. A magnetic material within the cup provides the magnetic force. Many magnetic materials are known to the art including strontium ferrite ceramic magnets, neodymium and samarium cobalt. To optimize performance and cost, combinations of known magnetic materials may be used, e.g., combinations of lower power magnets such as strontium ferrite ceramic, ferrite with higher power magnets such as neodymium or strontium cobalt, or either type with arnico or other medium power magnet.

The cup assembly allows the magnetic field to be forced to the outer edges of the cup to take full advantage of the magnets being used.

A magnet seated within the cup, such as a ring magnet e.g. a ceramic magnet such as a strontium ferrite ring having relatively less depth-of-pull, preferably not in contact with the sides of the cup, may be used to provide on-contact strength for the magnet. As will be apparent to those skilled in the art, other types of magnetic materials, or combinations thereof, may also be used. The shape of the magnetic material may be varied; however, the magnetic material should not extend to the top of the cup, since if it is in direct contact with the attracted material, either some of the magnetic force will be lost or the on-contact strength could be increased to unacceptable levels, depending on orientation of the poles of the magnetic material. In the preferred embodiment involving a cup-shaped pole piece having a diameter of two and a half inches and a height of one-half inch, there is a gap of about 0.15 inch between the magnetic material and the top of the cup.

In order to provide more depth-of-pull, additional magnetic material having a strong depth-of-pull in contact with the ring magnet, but separated from direct contact with the pole piece (outer edges of the cup) may be provided. Because the size of the manikin joint is limited, the size of the magnetic assembly will be limited, and it will usually be necessary to conserve space within the cup-shaped pole piece. Using nothing but strontium ferrite ceramic magnets in the preferred embodiment of this invention might require a pole piece too large to fit within the typical manikin joint. Thus, additional magnetic materials to provide depth-of-pull are preferably made of materials which provide greater depth-of-pull than the ceramic magnets. Neodymium magnets are preferred, e.g., neodymium-iron-boron materials. They may be in the form of a ring, radial arc segments, or any other desirable shape, so long as the separation from the sides of the pole piece is maintained and the desired depth-of-pull is achieved. In a preferred embodiment, the magnetic assembly comprises as additional magnetic material—two neodymium arc segments symmetrically placed opposite each other, and spanning about 45–90 degrees of arc in the ring magnet. The size of such additional magnetic materials is selected to provide the required depth-of-pull as will be evident to those of skill in the art, or easily ascertainable without undue experimentation using the information provided herein. The additional magnetic materials are spaced apart from the pole piece a sufficient distance so that the magnetic force therefrom is not substantially conducted through the pole piece. Preferably, the additional magnetic materials are spaced apart from the pole piece at least about one-eighth inch in the preferred embodiment hereof which involves the use of a circular cup-shaped pole piece having a height of one-half inch and a diameter of two and a half inches.

As will be readily apparent to those skilled in the art, the less expensive ceramic material can be entirely replaced with stronger magnetic material, and the size of the cup could be reduced accordingly; however, using a proportion of each type of material optimizes cost.

To facilitate embedding of the magnetic assembly, it preferably comprises a flange attached thereto by welding or other means known to the art which is covered by the material of the form as it is being molded or otherwise fabricated, leaving the remainder of the magnetic assembly uncovered. The flange may comprise one or more pieces of metal or other material welded to the bottom of the cup assembly so that it extends on both sides, or single pieces of metal or other material attached to the bottom of the cup so as to extend out on at least one side.

The top of the magnetic assembly preferably defines a plane, and the attracted material preferably presents a planar surface for mating with the magnetic assembly. A lid of metal, plastic or any other sheet-like material may be used to cover the magnetic assembly. Preferably, the attracted material is in the form of a disc of steel or other magnetically attracted material. The attracted material may also have flanges or other projections therefrom for embedding in the material of the form.

The planar surfaces of the attracted material and top of the magnetic assembly contact each other. Each of the magnetic assembly and attracted material may be equipped with a mating pin or pins and an optional indexing pin or pins, which mate with corresponding holes in the other of the attracted material or magnetic assembly. The mating pin is preferably centrally located, extending upward from the bottom of the cup magnet. Preferably it is rounded or chamfered to provide ease of seating in the corresponding mating holt when it comes into contact with an edge thereof. The index pin or pins may be similarly rounded or chamfered. A plurality of index holes may be provided so that the removable limb can be placed in different positions, e.g. an arm can be extended downward, outward or upward, a hand can be cupped or turned over, and the like.

If desired, additional means can be provided to the magnetic system for providing holding force in the direction of the magnetic attraction between the magnetic assembly and the attracted material. Such additional means can include Velcro strips, adhesive strips or other materials on the planar surfaces of the components or within the holes and pins, latches, or other means known to the art.

The magnetic assemblies and attracted materials may be sized to accommodate the joints being attached. For example, smaller versions might be used at the wrists and ankles. The proportion of materials having a stronger magnetism to mass ratio could be increased to allow for a stronger magnetic bond using the smaller size.

Methods for attaching removable pieces of forms are also provided herein comprising aligning the pieces to be attached and allowing them to be held in place by magnetic force, or placing the magnetic attachment systems in approximate alignment, and allowing magnetic force to complete the mating. Approximate alignment means that the components (the magnetic assembly and attracted material) are close enough together that the strength of the magnetic field at that distance (the depth-of-pull) is sufficient to pull the parts together. Specifically, the magnetic pull should be felt when the components are placed at least about one inch apart. It is often desirable that the distance between the removable piece and the form be greater than about one-half inch, and preferably greater than about two-thirds or three-fourths of an inch when sufficient pull is present to allow the pieces to "seek home." Greater precision than these distances is difficult to achieve when the operator is attempting to align the parts "blind," i.e. under clothing.

BRIEF DESCRIPTION OF THE DRAWINGS

FIG. 1 shows a form of this invention with removable and adjustable limbs.

FIG. 2 shows a portion of a cup magnet magnetic assembly of this invention.

FIG. 3 shows a cup magnet magnetic assembly of this invention comprising flanges, a mating pin and an index pin.

DETAILED DESCRIPTION

This invention provides manikins with magnetically attachable parts. One or more limbs selected from the group consisting of whole arms, forearms, upper arms, whole legs, thighs, lower legs, feet, hands, and head, fingers, toes, and features may be magnetically attachable. Surrealistic features such as wings, chimeric animal parts, and the like may also be magnetically attachable parts of this invention. Joint caps such as shoulder caps may also be attachable. In a preferred embodiment, the whole arms are magnetically attachable.

The magnetic attachment comprises two mating portions: a material capable to adhering to a magnet, referred to herein as the "attracted material," such as steel, iron, or other magnetically-adherent material known to the art; and one or more magnets or magnetized materials, referred to herein as the "magnetic material," selected and arranged to provide a depth-of-pull sufficient for the attachable part to begin to seek home at a distance of about one inch, preferably at least about 120 gauss at one inch. This arrangement of the selected magnetic material is referred to herein as the magnetic assembly.

Magnetic materials may be selected to optimize cost and performance, as is standard in the industry. Table 1 lists several magnetic materials, comparing costs and coercive strengths.

TABLE 1

Permanent Magnet Material Comparison Table

| Material | Cost Index | Coercivity Hci (KOe) |
|---|---|---|
| Nd—Fe—B (sintered) | 65% | Up to 30 |
| Nd—Fe—B (bonded) | 50% | Up to 11 |
| Sm—Co (sintered) | 100% | Up to 25 |
| Sm—Co (bonded) | 85% | Up to 10 |
| Alnico | 30% | Up to 2 |
| Hard Ferrite | 5% | Up to 3 |
| Flexible | 2% | Up to 2 |

Source: stanfordmagnets.com.

As will be appreciated by those of skill in the art, the placement of magnetic material with respect to pole pieces affects the flow and intensity of magnetic flux, and thus the strength of the magnetic assembly both in terms of on-contact strength and depth-of-pull. Placement of air gaps between magnetic material and pole pieces also affects performance. For example, in a cup magnetic assembly, if the ceramic or neodymium components are allowed to touch the sides of the cup, some of the lines of force will be short-circuited through the sides and not reach past the rim of the cup and thus not be able to flow into and hold the attracted material. However, magnetic material may be in contact with the sides of the cup if required to adjust the strength of the magnetic assembly.

The magnets may be fixed in desired relationship to each other and the pole piece(s) by means known to the art, e.g., adhesives.

Preferably, the mating parts also include at least one mating pin projecting from the face of one of the parts which fits into a hole sized to accommodate it on the other part.

One or more index pins may also project from the face of one of the parts, and fit into holes sized to accommodate them on the other part. In this way, the limb can be adjusted to display a variety of positions and postures.

Preferably the mating parts are in the form of substantially flat discs which may be equipped with flanges for embedding in the material of the form. The attracted material may be a disc having a flat face for mating, and the magnetic assembly preferably mates with this planar surface. In a preferred embodiment, the magnetic assembly comprises a cup construction made of a material such as steel, having magnets arranged therein. Preferably the magnets do not extend outward past the top of the "cup."

The mating parts are preferably round, but may be any shape, such as the cross sectional shape of the limb being attached, rectangular, ovoid, or other shapes, including shapes having mating concavities and convexities to provide sockets, or cylinders which may be nested together.

The depth-of-pull strength of the magnetic assembly is also important for allowing the pieces to be joined to easily "seek home," that is pull themselves into proper alignment when they have been approximately aligned. Exact alignment is difficult for the operator to achieve when dressing a manikin, since the parts to be joined will often be obscured by the clothing. The depth-of-pull strength should be sufficient for the parts to start moving together when they have been approximately aligned and are a distance of more than one-half inch apart, preferably a distance of one-third or more inches apart, more preferably three-fourths or more inches apart and, most preferably, at least one inch apart. The depth-of-pull should not be not so great as to cause injury to the operator, nor so little as to require that the pieces be placed in almost touching alignment, e.g. one-fourth inch apart, before they start to pull together.

Principles known to the art may be used to adjust the magnetic force, such as the thickness of the accepting material, the type of magnetic material used, and the mass of the magnetic material used.

Preferably, flanges extend outward from the mating parts so that the manikin body may be molded around them. Alternatively, the mating parts can be adhered to the manikin by any means known to the art including screws, welds, adhesives, and the like.

The manikin comprising the magnetically attachable parts is made of a material, preferably a molded polymeric material, capable of supporting the mating parts. Manikins of this invention comprising magnetically attachable parts may be replicas of normal human bodies, or may be missing one or more parts, such as head, feet, lower legs, or other parts enumerated above.

The attracted material may be on the manikin trunk or larger body part, and the magnetic material is on the smaller part to be attached, or vice versa. In one embodiment of this invention, manikins are equipped with magnetic mating parts at some or all joints normally articulable in the human body.

Figure 1A:
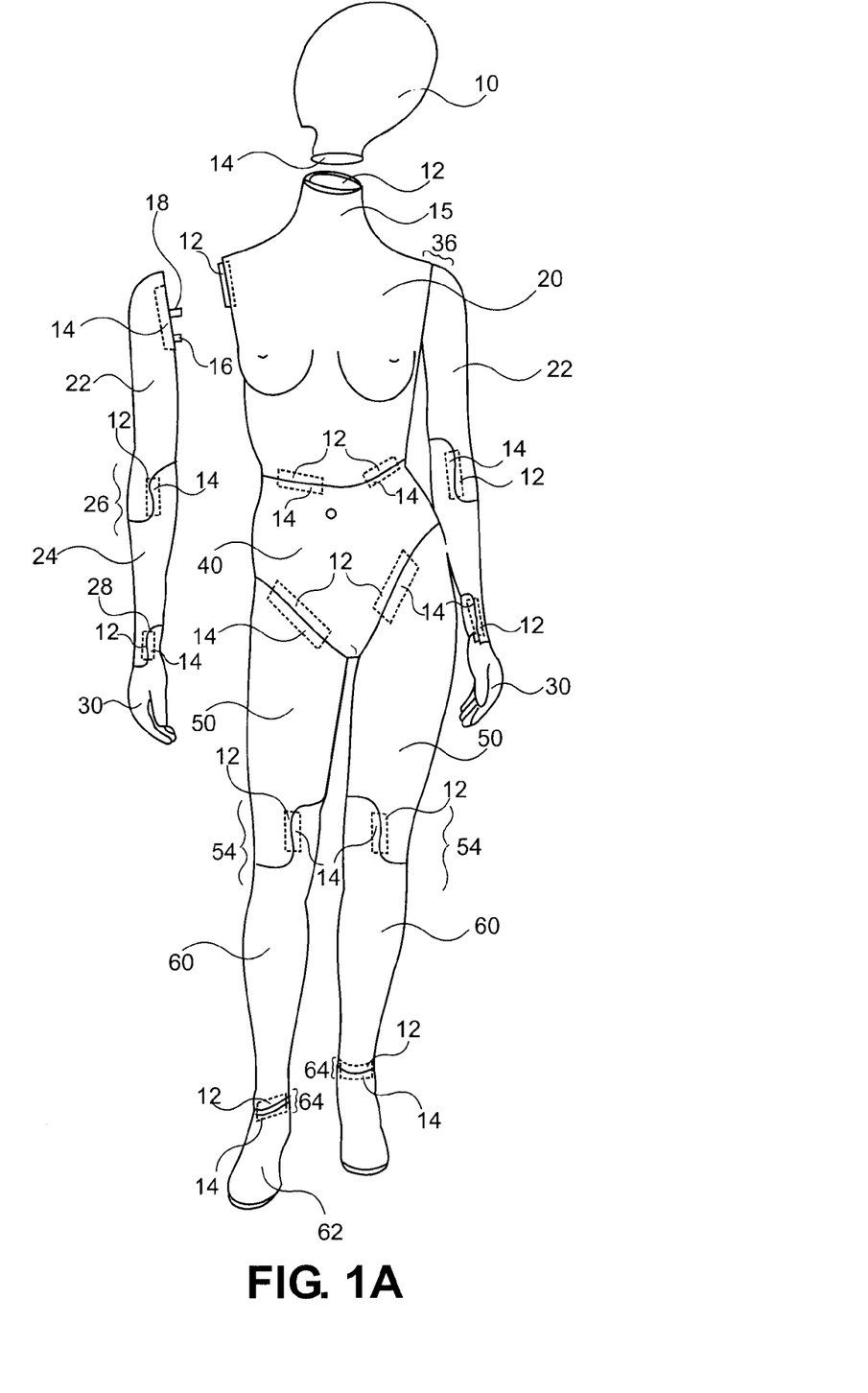
FIG. 1A shows a front view and FIG. 1B shows a side view.

FIG. 1A depicts a front view of a manikin of this invention equipped with mating magnetic portions. The attracted material is a metallic plate 12 and the magnetic assembly 14 is mated thereto. Mating portions are present between the head 10 and the neck 15, between the torso 20 and the upper arms 22 at the shoulder joint 36, between the upper arms 22 and the lower arms 24 at the elbow joints 26, between the lower arms 24 and hands 30 at the wrists 28, between the torso 20 and pelvis 40, between the pelvis 40 and upper legs 50, between the upper legs 50 and lower legs 60 at the knee joints 54, and between the lower legs 60 and the feet 62 at the ankle joint 64. A mating pin 18 and an indexing pin 16 are shown in the magnetic assembly 14 of the left shoulder.

Figure 1B:
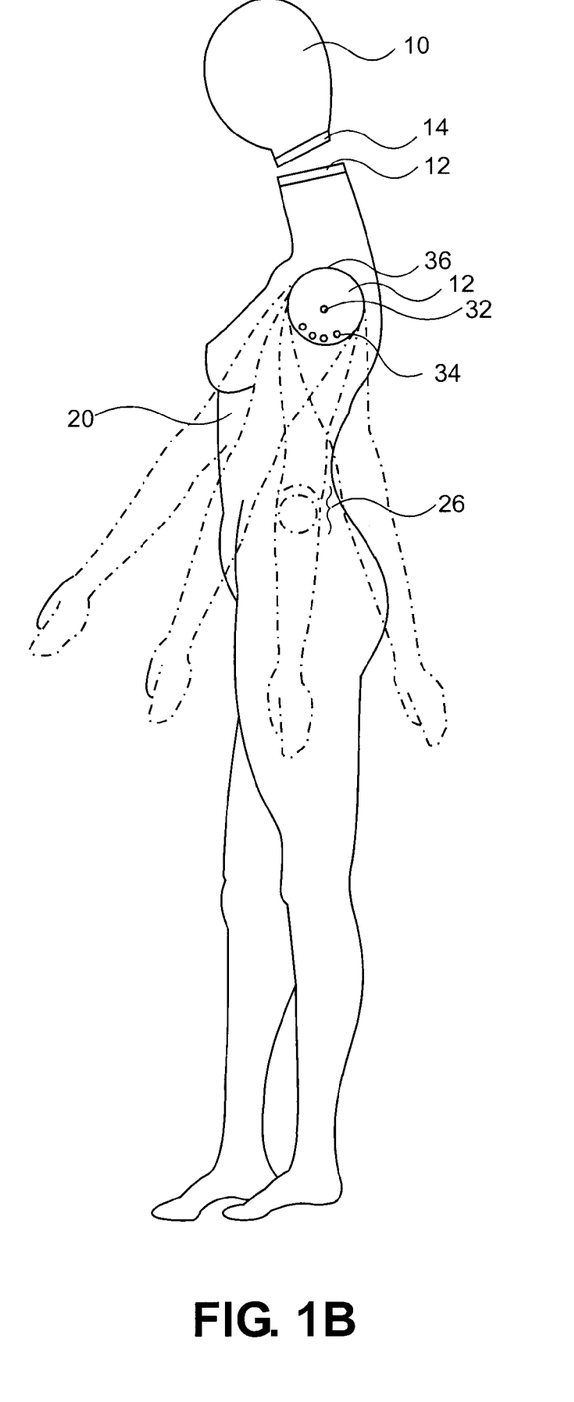

FIG. 1B shows a side view of a manikin of this invention showing a metallic plate 12 attached at the neck, at the shoulder 36, and elbow 26, and indicating a variety of positions for the arm attainable using indexing pins in the magnetic element (not shown) which fit into corresponding indexing holes 34 shown in metallic plate 12 at the shoulder 36. This metallic plate 12 also shows mating hole 32.

Figure 2A:
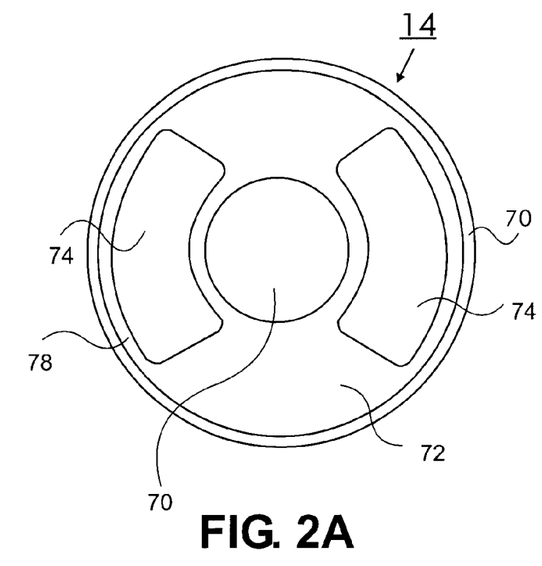
FIG. 2A is a top plan view.
Figure 2B:
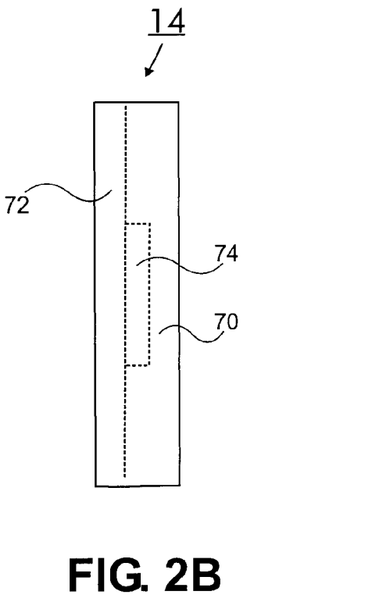
FIG. 2B is a side view.

FIG. 2A shows a magnetic assembly 14 of this invention consisting of a pole piece 70 in the form of a cup. Inside the cup is a ring magnet 72 in contact with the sides and bottom of the cup. Atop the ring magnet are two neodymium magnets 74 separated from the outer rim of the cup by space 78. FIG. 2B is a side view of the magnetic assembly of FIG. 2A, showing that the ring magnet 72 underlies the neodymium magnets 74, and indicating that the neodymium magnets do not extend to the top of the cup.

In the preferred embodiment, the cup is a steel cup having a 2.5 inch diameter weighing 114.5 g and about a 0.5 inch diameter hole in the center through which the mating pin extends. The ring magnet is strontium ferrite and weighs 85.58 g. Two neodymium magnets weigh 17.9 g each. A stainless steel cover plate, not shown, weighs 12.5 g, the mating pin weighs 16.4 g, the flange with the indexing pin weighs 28.0 g, and the entire assembly weighs 293 g.

Figure 3A:
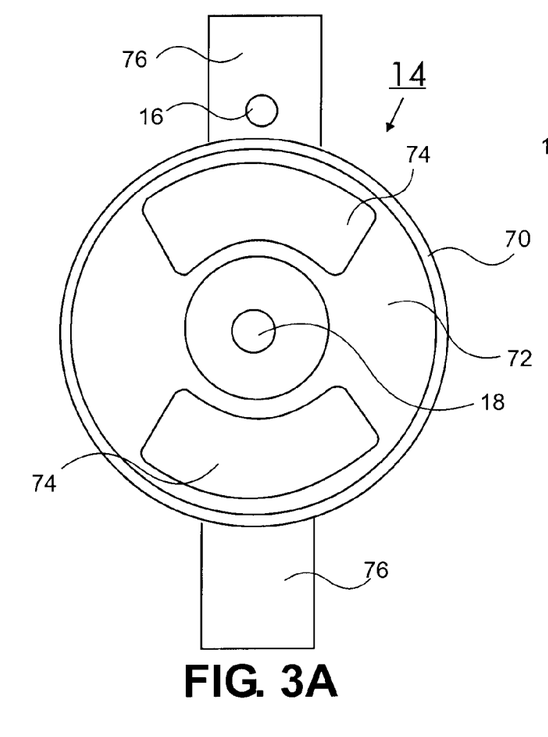
FIG. 3A is a plan view and FIG. 3B is a side view.
Figure 3B:
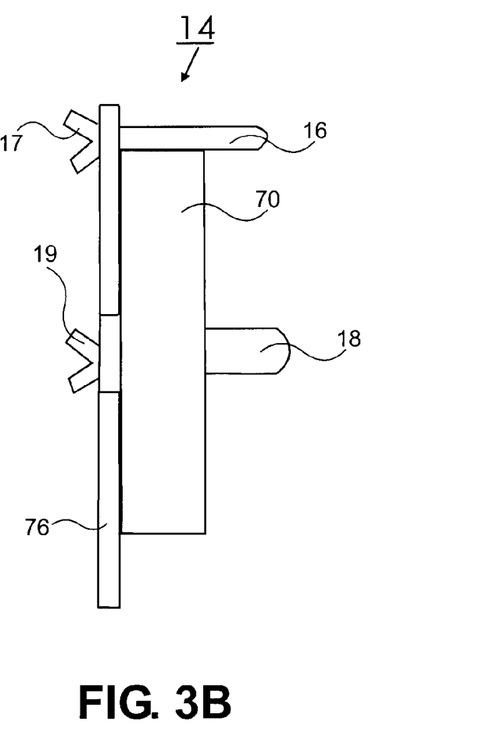

FIG. 3A shows the magnetic assembly equipped with flanges 76 for embedding the assembly in the material of the manikin, mating pin 18 for mating with a corresponding mating hole in the attracted material (metallic plate), and indexing pin 16 on flange 76 for mating with a corresponding indexing hole in the metallic plate. FIG. 3B is a side view of the magnetic assembly 14 of FIG. 3A, and shows the staked end 17 of the indexing pin 16 and staked end 19 of mating pin 18.

Figure 4:
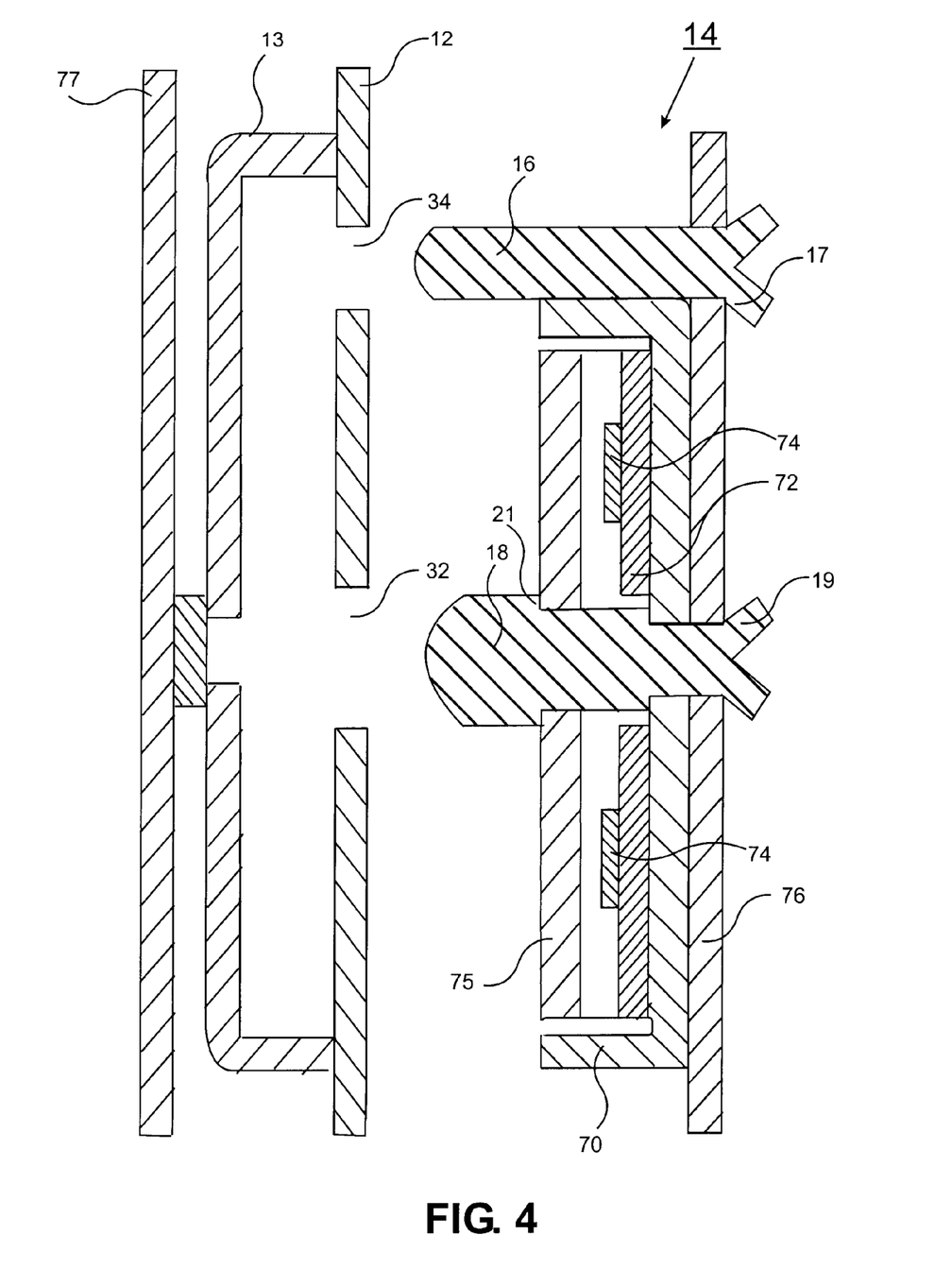
FIG. 4 shows a magnetic assembly of this invention mated with an attracted material.

FIG. 4 shows the magnetic assembly 14 and metallic plate 12 attached to a cup 13 equipped with a flange 77 for embedding within the material of the manikin. The mating pin 18 and indexing pin 16 extend into the metallic plate 12 when the magnetic system is in use, through mating hole 32 and indexing hole 34 provided therein. Magnetic assembly 14 is equipped with flange 76 for embedding it within the material of the manikin. The magnetic assembly 14 comprises pole piece 70, ring magnet 72, neodymium magnets 74, mating pin 18, indexing pin 16, and lid 75. Mating pin 18 comprises a shoulder 21 to retain lid 75 in place.

The metallic plate is preferably included in a mating cup 13 equipped with flanges 77 to provide appropriate recesses for the mating and indexing pins. Preferably, the plate has a diameter of 3.5 inches, and a hole having a diameter of about 0.5 inches in the center to accommodate the mating pin. The mating plate may be embedded in the material of the form via the flanges, or it may be screwed or otherwise attached to structures molded into the form for that purpose.

Figure 5:
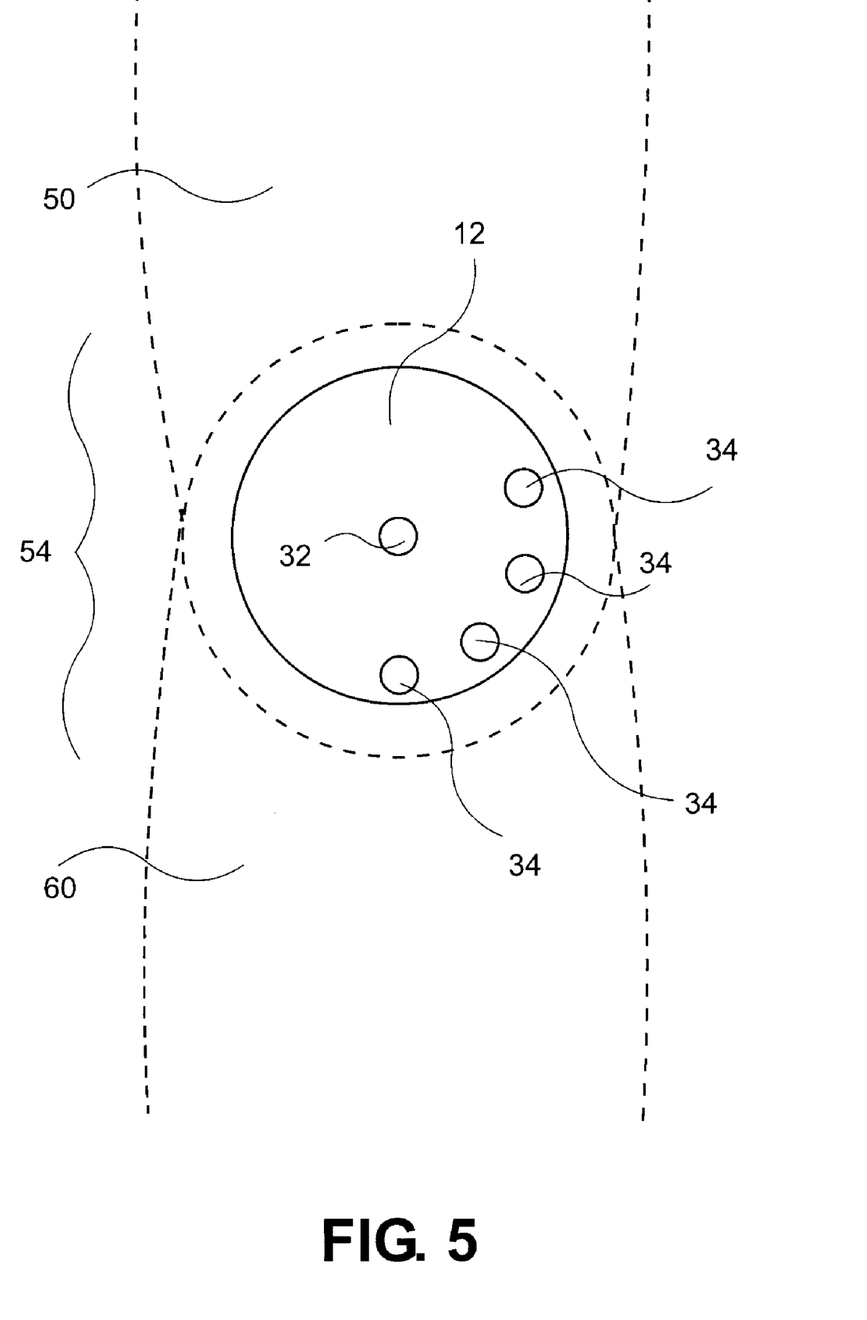
FIG. 5 is a side view of a knee joint showing the metallic plate.

FIG. 5 shows a right side view of the knee joint 54 showing the metallic plate 12 in upper leg 50, with indexing holes 34 and mating hole 32.

Figure 6A:
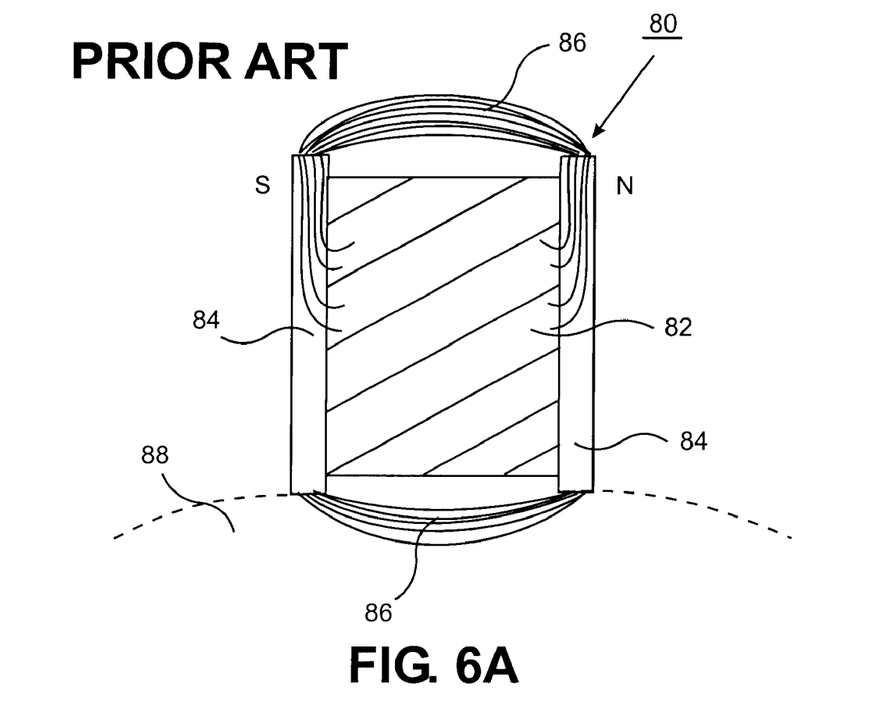
FIGS. 6A and 6B compare the lines of magnetic force in prior art form attachment magnet assemblies and the magnet assembly of this invention, showing how greater depth-of-pull is achieved in this invention.

FIG. 6A shows an end view of a prior art sandwich magnet consisting of a ceramic magnet 82 and steel pole pieces 84. Lines of magnetic force 86 indicate how the magnetic force runs from the magnet to the pole pieces, and across the top through the air between the pole pieces, as well as across the bottom through the material of the manikin 88. This type of magnet design can provide good on-contact strength, but little depth-of-pull. Magnetic poles are indicated as N and S.

Figure 6B:
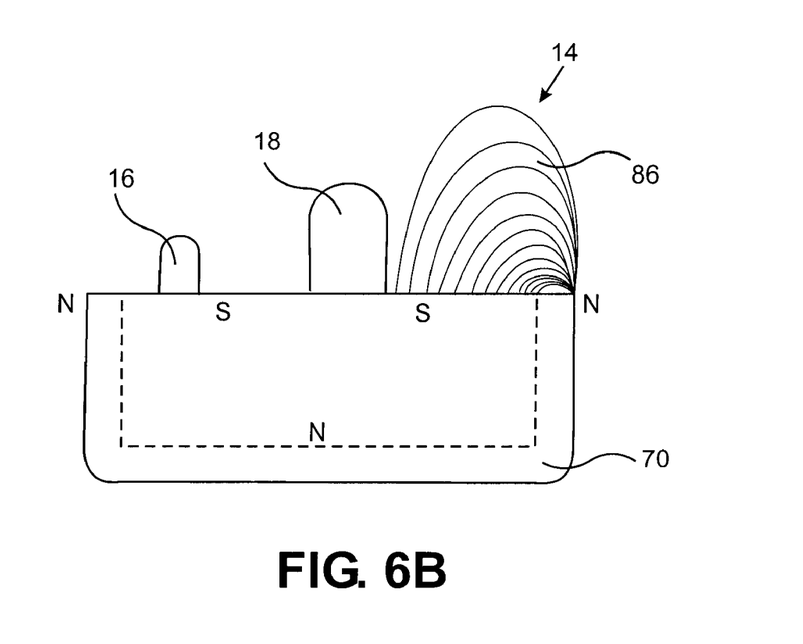

In contrast, FIG. 6B shows a magnetic assembly 14 of this invention in which the lines of magnetic force 86 extend upward from the edge of pole piece 70 to provide a large depth-of-pull. Mating pin 18 and index pin 16 are also shown in this view. Magnetic poles are indicated as N and S.

To make the devices of this invention, the components of the magnetic assembly may be glued or soldered or otherwise adhered. The metallic plate and magnetic assembly are then embedded in the manikin, preferably by molding the manikin around flanges or other projections thereof, however, these components may also be attached to the manikin by other means such as screws, adhesives, and the like, all as known to the art.

To use the magnetic joints of this invention, two parts are approximately aligned, and the depth-of-pull strength of the magnetic assembly then pulls the parts into place, with the mating pins and indexing pins in their corresponding holes. A plurality of indexing holes may be provided so that the limb can be placed in alternative positions.

EXAMPLE

Figure 7A:
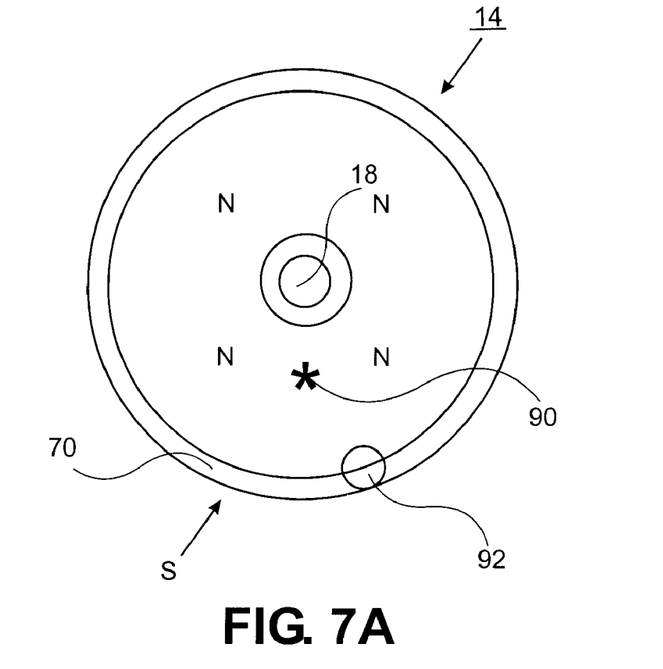
FIGS. 7A and 7B compare the depth-of-pull at the strongest points of attraction for the magnetic assembly of this invention and a prior art sandwich magnet.
Figure 7B:
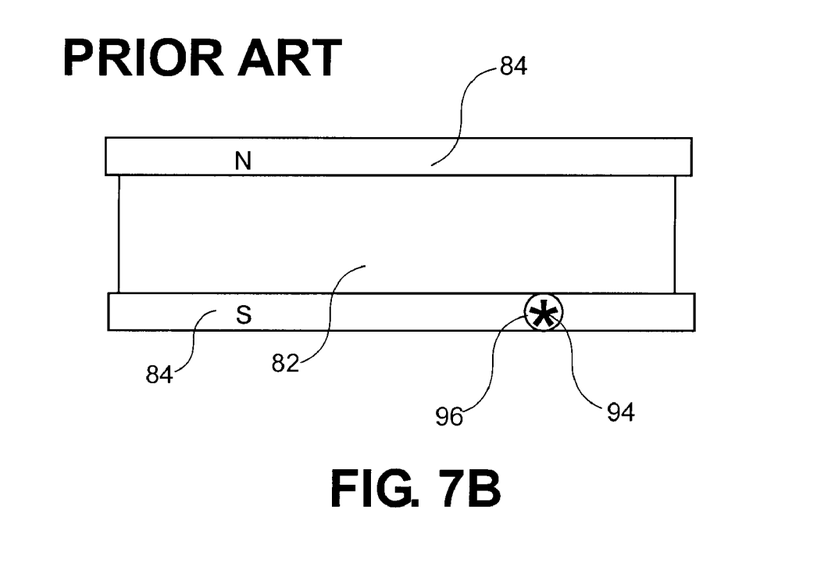

The on-contact and depth-of-pull strengths of magnetic assemblies of this invention were tested and compared to those of conventional sandwich magnets using a gauss meter. FIG. 7A shows the magnetic assembly of this invention with the poles labeled N (north) and S (south). The asterisk 90, positioned about one-fourth inch from the center of the 2.5-inch-diameter magnetic assembly, indicates that the strongest depth-of-pull force was measured at this distance from the center. The circle 92 on the perimeter of the pole piece 70 indicates that the strongest on-contact force is measured at the perimeter. FIG. 7B shows a sandwich magnet of the prior art. The asterisk 94 indicates where the strongest depth-of-pull forces were measured. This point also corresponds to circle 96, the point where the strongest on-contact forces were measured. The magnet of this invention weighed 0.581 pounds. The sandwich magnet weighed 1.187 pounds. Results are shown in Table 2.

TABLE 2

| Distance from Magnet | Neodymium Cup Assembly | Two-pole Strontium Ferrite Sandwich Assembly |
| --- | --- | --- |
| Strongest contact on Pole Piece | 2560 gauss | 1410 gauss |
| Strongest Point on Magnet | 4021 gauss | 1410 gauss |
| 1/32 inch | 3850 gauss | 1090 gauss |
| 1/8 inch | 2880 gauss | 790 gauss |
| 1/4 inch | 1890 gauss | 510 gauss |
| 1/2 inch | 850 gauss | 270 gauss |
| 3/4 inch | 380 gauss | 160 gauss |
| 1 inch | 240 gauss | 110 gauss |

These results show the superior depth-of-pull provided by the present invention. At 1/8 inch from the magnet, the force of the sandwich magnet begins to drop off drastically, despite the fact that the sandwich magnet weighs nearly twice as much as the magnetic assembly of this invention.

Although this invention has been illustrated using various specific components, it will be appreciated by those skilled in the art that alternative constructions and methods can be substituted for those described, and are equivalent thereto.

What is claimed is:

1. A manikin having a removable piece attached thereto by a magnetic system comprising:
   (a) a magnetic assembly having a depth-of-pull sufficient to cause the removable piece to begin to move towards the manikin at a distance from the manikin of more than one-quarter of an inch, said magnetic assembly being positioned on said manikin or said removable piece; and
   (b) an attracted material positioned on the other of said manikin or said removable piece so as to mate with said magnetic assembly wherein said magnetic assembly is a cup magnetic assembly comprising a cup serving as a pole piece, said cup having at least one magnet therein.

2. The manikin of claim 1 wherein said depth-of-pull is sufficient to cause the removable piece to begin to move toward the manikin at a distance of more than three-fourths of an inch.

3. The manikin of claim 1 wherein said depth-of-pull is sufficient to cause the removable piece to begin to move toward the manikin at a distance of more than two-thirds of an inch.

4. The manikin of claim 1 wherein said depth-of-pull is sufficient to cause the removable piece to begin to move toward the manikin at a distance of more than one-half of an inch.

5. The manikin of claim 1 wherein said depth-of-pull is sufficient to cause the removable piece to begin to move toward the manikin at a distance of at least one inch.

6. The manikin of claim 1 wherein said magnetic assembly has a depth-of-pull of at least 120 gauss at a distance of one inch.

7. The manikin of claim 6 wherein said magnetic assembly has a depth-of-pull of at least 200 gauss at a distance of one inch.

8. The manikin of claim 6 wherein said magnetic assembly has a depth-of-pull of at least 240 gauss at a distance of one inch.

9. The manikin of claim 6 wherein said magnetic assembly has a depth-of-pull of at most 250 gauss at a distance of one inch.

10. The manikin of claim 1 wherein said magnetic assembly has a depth-of-pull of at least 380 gauss at a distance of three-fourths inch.

11. The manikin of claim 1 wherein said magnetic assembly has a depth-of-pull of at least 850 gauss at a distance of one-half inch.

12. The manikin of claim 1 wherein said magnetic assembly has an on-contact strength of at least 0.5 pounds.

13. The manikin of claim 12 wherein said magnetic assembly has an on-contact strength of no more than 20 pounds.

14. The manikin of claim 1 wherein said magnetic assembly has an on-contact strength of at least 60 pounds.

15. The manikin of claim 14 wherein said magnetic assembly has an on-contact strength of at least 85 pounds.

16. The manikin of claim 14 wherein said magnetic assembly has an on-contact strength of at least 100 pounds.

17. The manikin of claim 1 wherein said magnetic assembly has an on-contact strength no greater than 180 pounds.

18. The manikin of claim 17 wherein said magnetic assembly has an on-contact strength no greater than 120 pounds.

19. The manikin of claim 1 wherein said magnetic assembly is a cup magnetic assembly comprising a circular cup serving as a pole piece.

20. The manikin of claim 19 wherein said magnetic assembly comprises a ring magnet positioned within said cup.

21. The manikin of claim 19 wherein said magnetic assembly comprises at least one neodymium magnet.

22. The manikin of claim 21 wherein said magnetic assembly comprises two neodymium radial arc magnets touching a ceramic magnet but spaced apart from said pole piece.

23. The manikin of claim 21 wherein said radial arc magnets are spaced apart from said pole piece at least one-eighth inch.

24. The manikin of claim 10 wherein said circular cup comprises at least one flange attached thereto for embedding into the material of said manikin form.

25. The manikin of claim 24 wherein said flange is attached to the bottom of said circular cup.

26. The manikin of claim 19, wherein the magnetic assembly comprises a magnet selected from the group consisting of neodymium magnets, samarium cobalt magnets, and arnico magnets.

27. The manikin of claim 1 wherein said magnetic system comprises a disc of attracted material for mating with said magnetic assembly which presents a planar circular face.

28. The manikin of claim 27 wherein said magnetic system comprises at least one mating pin on one said magnetic assembly or said circular face, and a mating hole positioned to mate with said mating pin on the other of said magnetic assembly or said circular face.

29. The manikin of claim 27 wherein said magnetic system comprises at least one index pin on one of said magnetic assembly or said circular face, and an index hole positioned to mate with said index pin on the other of said magnetic assembly or said circular face.

30. The manikin of claim 29 wherein said magnetic system comprises a plurality of index holes positioned to mate with said index pin.

31. The manikin of claim 1 wherein said attracted material is on said removable piece.

32. The manikin of claim 1 wherein said attracted material is on said manikin.

33. The manikin of claim 1 comprising a removable piece comprising said attracted material at one end and said magnetic assembly on the other end.

34. The manikin of claim 1 wherein said removable piece is selected from the group consisting of an arm, an upper arm, a lower arm, a hand, a leg, an upper leg, a lower leg, a foot, a head, a torso, a pelvis and a cap.

35. The manikin of claim 34 wherein said magnetic assembly has an on-contact strength of no more than 20 pounds.

36. A manikin having a removable piece attached thereto by a magnetic system comprising:

(a) a magnetic assembly having a depth-of-pull sufficient to cause the removable piece to begin to move towards the manikin at a distance from the manikin of more than one-quarter of an inch, said magnetic assembly being positioned on said manikin or said removable piece; and (b) an attracted material positioned on the other of said manikin or said removable piece so as to mate with said magnetic assembly wherein said magnetic assembly is sized for a life-sized manikin joint, has a depth of pull of at least 200 gauss at a distance of one inch, and has an on-contact strength between 85 pounds and 120 pounds.

37. A manikin having a removable piece attached thereto by a magnetic system comprising:

(a) a magnetic assembly having a depth-of-pull sufficient to cause the removable piece to begin to move towards the manikin at a distance from the manikin of more than one-quarter of an inch, said magnetic assembly being positioned on said manikin or said removable piece; and (b) an attracted material positioned on the other of said manikin or said removable piece so as to mate with said magnetic assembly wherein said magnetic assembly has a depth-of-pull of at least 200 gauss at a distance of one inch.

* * * * *

UNITED STATES PATENT AND TRADEMARK OFFICE
CERTIFICATE OF CORRECTION

PATENT NO.      : 6,705,794 B2
DATED           : March 16, 2004
INVENTOR(S)     : Varner et al.

It is certified that error appears in the above-identified patent and that said Letters Patent is hereby corrected as shown below:

Column 11,
Line 1, please replace "claim 10" with -- claim 19 --.
Line 3, please delete "form" following "manikin".
Line 14, please replace "one said" with -- one of said --.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,705,794 C1
APPLICATION NO. : 90/012231
DATED : February 11, 2013
INVENTOR(S) : Richard Varner, James D. Barber and James Talaric It is certified that error appears in the above-identified patent and that said Letters Patent is hereby corrected as shown below:

Title Page, Item (73) should read

-- (73) Assignee: Fusion Specialties, Inc., Broomfield, CO (US) --.

Signed and Sealed this
Second Day of July, 2013

Teresa Stanek Rea
*Acting Director of the United States Patent and Trademark Office*

EX PARTE REEXAMINATION CERTIFICATE (9510th)
United States Patent
Varner et al.

(10) Number: US 6,705,794 C1
(45) Certificate Issued: Feb. 11, 2013

(54) DISPLAY FORM HAVING MAGNETICALLY ATTACHABLE PARTS

(75) Inventors: Richard Varner, Longmont, CO (US); James D. Barber, Longmont, CO (US); James Talaric, Louisville, CO (US)

(73) Assignee: Keybank National Association, Cleveland, OH (US)

Reexamination Request:
No. 90/012,231, Apr. 2, 2012

Reexamination Certificate for:
Patent No.: 6,705,794
Issued: Mar. 16, 2004
Appl. No.: 09/771,431
Filed: Jan. 26, 2001

Certificate of Correction issued Jun. 22, 2004.

Related U.S. Application Data

(60) Provisional application No. 60/178,187, filed on Jan. 26, 2000.

(51) Int. Cl.
*A63H 3/14* (2006.01)
*D06C 15/00* (2006.01)
*F16C 11/00* (2006.01)
*F16D 1/12* (2006.01)
*F16G 11/00* (2006.01)

(52) U.S. Cl. ............ 403/24; 403/84; 403/104; 403/404; 403/DIG. 1; 223/66

(58) Field of Classification Search ................... 446/378
See application file for complete search history.

(56) References Cited

To view the complete listing of prior art documents cited during the proceeding for Reexamination Control Number 90/012,231, please refer to the USPTO's public Patent Application Information Retrieval (PAIR) system under the Display References tab.

*Primary Examiner* — Russell Stormer (57) ABSTRACT

Forms for display of clothing and the like with magnetically attachable parts are provided. The magnetic joints comprise a magnetic assembly with a depth-of-pull sufficient to cause the attachable part to begin to pull toward the form at a distance preferably greater than one-half inch, preferably about one inch. Preferably the magnetic assembly has a depth-of-pull of at least about 120 gauss at a distance of one inch. A metallic plate is arranged in mating configuration with the magnetic assembly. Mating pins may be provided, as well as indexing pins. If the manikin is knocked over, or if the attached part is pulled or bumped, it will come loose rather than breaking off; and the mating parts are self-seeking in use, so that they will come together in proper orientation even when being mated beneath clothes. A bump to the manikin sufficient to overcome the on-contact strength of the magnetic attachment may not result in detachment of the limb because of the depth-of-pull strength of the magnetic assembly. The indexing pins allow the limbs to be placed in a variety of positions.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 38 -52:

In a preferred embodiment hereof, a cup magnetic assembly comprising a circular cup which serves as a pole piece is provided. It is believed that the cup shape focuses the magnetic energy toward the front (top edge of the cup), minimizing leakage of magnetic force. The cup need not be circular, it can also be square, rectangular, oval, polygonal, or other shapes. A magnetic material within the cup provides the magnetic force. Many magnetic materials are known to the art including strontium ferrite ceramic magnets, neodymium and samarium cobalt. To optimize performance and cost, combinations of known magnetic materials may be used, e.g., combinations of lower power magnets such as strontium ferrite ceramic, ferrite with higher power magnets such as neodymium or strontium cobalt, or either type with [arnico] *alnico* or other medium power magnet.

AS A RESULT OF REEXAMINATION, IT HAS BEEN DETERMINED THAT:

The patentability of claim 36 is confirmed.

Claims 5, 6, 12, 17 and 19 are cancelled.

Claims 1, 7-9, 13-16, 18, 20, 21, 23, 24, 26 and 37 are determined to be patentable as amended.

Claims 2-4, 10, 11, 22, 25 and 27-35, dependent on an amended claim, are determined to be patentable.

New claims 38 and 39 are added and determined to be patentable.

1. A manikin having a removable piece attached thereto by a magnetic system comprising:
   (a) a magnetic assembly having a depth-of-pull sufficient to cause the removable piece to begin to move towards the manikin at a distance from the manikin of more than one-quarter of an inch, said magnetic assembly being positioned on said manikin or said removable piece; and
   (b) an attracted material positioned on the other of said manikin or said removable piece so as to mate with said magnetic assembly*;*
   wherein said magnetic assembly is a cup magnetic assembly comprising a cup serving as a pole piece, said cup having at least one magnet therein*;*
   *wherein the magnet does not extend to the top of the cup;*
   *wherein said depth-of-pull is at least about 120 gauss at a distance of one inch; and*
   *wherein said depth-of-pull is exerted directly from the top rim of said cup toward said attracted material: and wherein said magnetic assembly has an on-contact strength between about 0.5 and about 180 pounds.*

7. The manikin of claim [6] *1* wherein said magnetic assembly has a depth-of-pull of at least 200 gauss at a distance of one inch.

8. The manikin of claim [6] *1* wherein said magnetic assembly has a depth-of-pull of at least 240 gauss at a distance of one inch.

9. The manikin of claim [6] *1* wherein said magnetic assembly has a depth-of-pull of at most 250 gauss at a distance of one inch.

13. The manikin of claim [12] *1* wherein said magnetic assembly has an on-contact strength of no more than 20 pounds.

14. The manikin of claim 1 wherein said magnetic assembly has an on-contact strength of at least *about* 60 *to about 180* pounds.

15. The manikin of claim 14 wherein said magnetic assembly has an on-contact strength of at least *about* 85 *to about 180* pounds.

16. The manikin of claim 14 wherein said magnetic assembly has an on-contact strength of at least *about* 100 *to about 180* pounds.

18. The manikin of claim [17] *1* wherein said magnetic assembly has an on- contact strength no greater than 120 pounds.

20. The manikin of claim [19] *1* wherein said magnetic assembly comprises a ring magnet positioned within said cup.

21. The manikin of claim [19] *1* wherein said magnetic assembly comprises at least one neodymium magnet.

23. The manikin of claim [21] *22* wherein said radial arc magnets are spaced apart from said pole piece at least one-eighth inch.

24. The manikin of claim [19] *1* wherein said circular cup comprises at least one flange attached thereto for embedding into the material of said manikin.

26. The manikin of claim [19] *1* , wherein the magnetic assembly comprises a magnet selected from the group consisting of neodymium magnets, samarium cobalt magnets, and [arnico] *alnico* magnets.

37. A manikin having a removable piece attached thereto by a magnetic system comprising:
   (a) a magnetic assembly having a depth-of-pull sufficient to cause the removable piece to begin to move towards the manikin at a distance from the manikin of more than one-quarter of an inch, said magnetic assembly being positioned on said manikin or said removable piece, and
   (b) an attracted material positioned on the other of said manikin or said removable piece so as to mate with said magnetic assembly wherein said magnetic assembly has a depth-of-pull of at least 200 gauss at a distance of one inch *and an on-contact strength between about 0.5 and about 180 pounds.*

*38. The manikin of claim 37 wherein said magnetic assembly also comprises means for providing holding force in the direction of the magnetic attraction between the magnetic assembly and the attracted material.*

*39. The manikin of claim 38 wherein said means for providing holding force is selected from the group consisting of VELCRO® strips, adhesive strips, pins, and/or latches.*

* * * * *